US009524517B2

(12) United States Patent
McGivney et al.

(10) Patent No.: US 9,524,517 B2
(45) Date of Patent: Dec. 20, 2016

(54) METHOD OF OPERATING A SELF-SERVICE TERMINAL TO PROVIDE ON-DEMAND POSTAGE STAMP LABELS TO A POSTAGE STAMP BUYER AND A SELF-SERVICE TERMINAL THEREFOR

(75) Inventors: Charlie McGivney, Scotland (GB); Jerry Butler, Belvedere, CA (US); Mary Ann Wehr, Hamilton, OH (US)

(73) Assignee: Iconex LLC, Duluth, GA (US)

( * ) Notice: Subject to any disclaimer, the term of this patent is extended or adjusted under 35 U.S.C. 154(b) by 810 days.

(21) Appl. No.: 13/102,803

(22) Filed: May 6, 2011

(65) Prior Publication Data

US 2012/0284184 A1   Nov. 8, 2012

(51) Int. Cl.
| | | |
|---|---|---|
| *G06Q 40/00* | (2012.01) | |
| *G06Q 30/06* | (2012.01) | |
| *G07F 17/26* | (2006.01) | |
| *G07F 17/42* | (2006.01) | |
| *G07B 17/00* | (2006.01) | |

(52) U.S. Cl.
CPC ......... *G06Q 30/06* (2013.01); *G07B 17/00508* (2013.01); *G07F 17/26* (2013.01); *G07F 17/42* (2013.01); *G07B 2017/0062* (2013.01); *G07B 2017/00225* (2013.01)

(58) Field of Classification Search
CPC .......... G06Q 30/06; G07F 17/26; G07F 17/42; G07B 17/00508; G07B 2017/00225; G07B 2017/0062
USPC ........................................... 705/43, 401, 407
See application file for complete search history.

(56) References Cited

U.S. PATENT DOCUMENTS

| | | | | | |
|---|---|---|---|---|---|
| 3,782,616 | A | * | 1/1974 | Surber, Jr. ............... | G07F 11/68 221/144 |
| 4,077,827 | A | * | 3/1978 | Jones ..................... | G03C 11/14 156/352 |
| 4,584,220 | A | * | 4/1986 | Melbye ................... | B05C 17/06 428/187 |
| 5,023,668 | A | * | 6/1991 | Kluy .................. | G03G 15/1605 399/165 |
| 5,122,967 | A | * | 6/1992 | Gilham ............ | G07B 17/00193 221/71 |

(Continued)

OTHER PUBLICATIONS

Gordon, G. V., Tabler, R. L., Perz, S. V., Stasser, J. L., & Tonge, J. S. (1998). Silicone Release Coatings: Learning to Let Go Retrieved from http://dialog.proquest.com/professional/docview/44629727?accountid=142257 on May 31, 2016.*

*Primary Examiner* — Kito R Robinson
(74) *Attorney, Agent, or Firm* — Schwegman Lundberg & Woessner, P.A.

(57) ABSTRACT

A publicly-accessible self-service terminal is provided for enabling a self-service terminal user to purchase on-demand postage stamp labels in advance. The publicly-accessible self-service terminal includes a user interface arranged to receive a request from a postage stamp buyer to purchase on-demand postage stamp labels in advance, a payment acceptor arranged to receive payment from the postage stamp buyer for purchase of on-demand postage stamp labels in advance, a roll paper printer arranged to dispense a panel portion of the roll of pre-printed self-adhesive to the postage stamp buyer, and a controller arranged to control the roll paper printer to dispense the panel portion to the postage stamp buyer.

16 Claims, 14 Drawing Sheets

(56) References Cited

U.S. PATENT DOCUMENTS

| | | | | |
|---|---|---|---|---|
| 5,194,324 A * | 3/1993 | Poirier | B32B 27/32 | 428/315.5 |
| 5,586,037 A * | 12/1996 | Gil | G06Q 30/0283 | 700/213 |
| 5,865,926 A * | 2/1999 | Wu | B29C 55/18 | 156/229 |
| 6,074,747 A * | 6/2000 | Scholz | B41M 5/502 | 206/411 |
| 6,242,552 B1 * | 6/2001 | Su | C08F 220/18 | 526/318.43 |
| 6,945,457 B1 * | 9/2005 | Barcelou | G06Q 20/102 | 235/380 |
| 7,069,253 B2 * | 6/2006 | Leon | G07B 17/00024 | 705/408 |
| 7,603,315 B2 * | 10/2009 | Ross | G06Q 20/10 | 235/379 |
| 7,949,614 B2 * | 5/2011 | Blumberg | B41J 11/009 | 347/2 |
| 7,970,136 B2 * | 6/2011 | Blumberg | B41J 3/4075 | 355/133 |
| 8,424,755 B1 * | 4/2013 | Irudayam | G07F 19/201 | 235/375 |
| 2002/0007281 A1 * | 1/2002 | Gil | G07B 17/00193 | 705/407 |
| 2002/0046057 A1 * | 4/2002 | Ross | G06Q 20/10 | 705/43 |
| 2002/0185856 A1 * | 12/2002 | Hanefeld | B26F 1/02 | 283/71 |
| 2003/0084007 A1 * | 5/2003 | Brookner | G07B 17/00508 | 705/408 |
| 2003/0110083 A1 * | 6/2003 | Taylor | G06Q 20/208 | 705/23 |
| 2003/0187666 A1 * | 10/2003 | Leon | G07B 17/00193 | 705/404 |
| 2004/0015453 A1 * | 1/2004 | Youngblood | G07B 17/00193 | 705/410 |
| 2004/0112950 A1 * | 6/2004 | Manduley | G07B 17/00508 | 235/375 |
| 2007/0100672 A1 * | 5/2007 | McBrida | G06Q 10/025 | 705/6 |
| 2007/0255664 A1 * | 11/2007 | Blumberg | B41J 11/009 | 705/408 |
| 2010/0153310 A1 * | 6/2010 | Huebler | G07B 17/00193 | 705/408 |
| 2013/0271542 A1 * | 10/2013 | Leighton | B41J 15/04 | 347/104 |

* cited by examiner

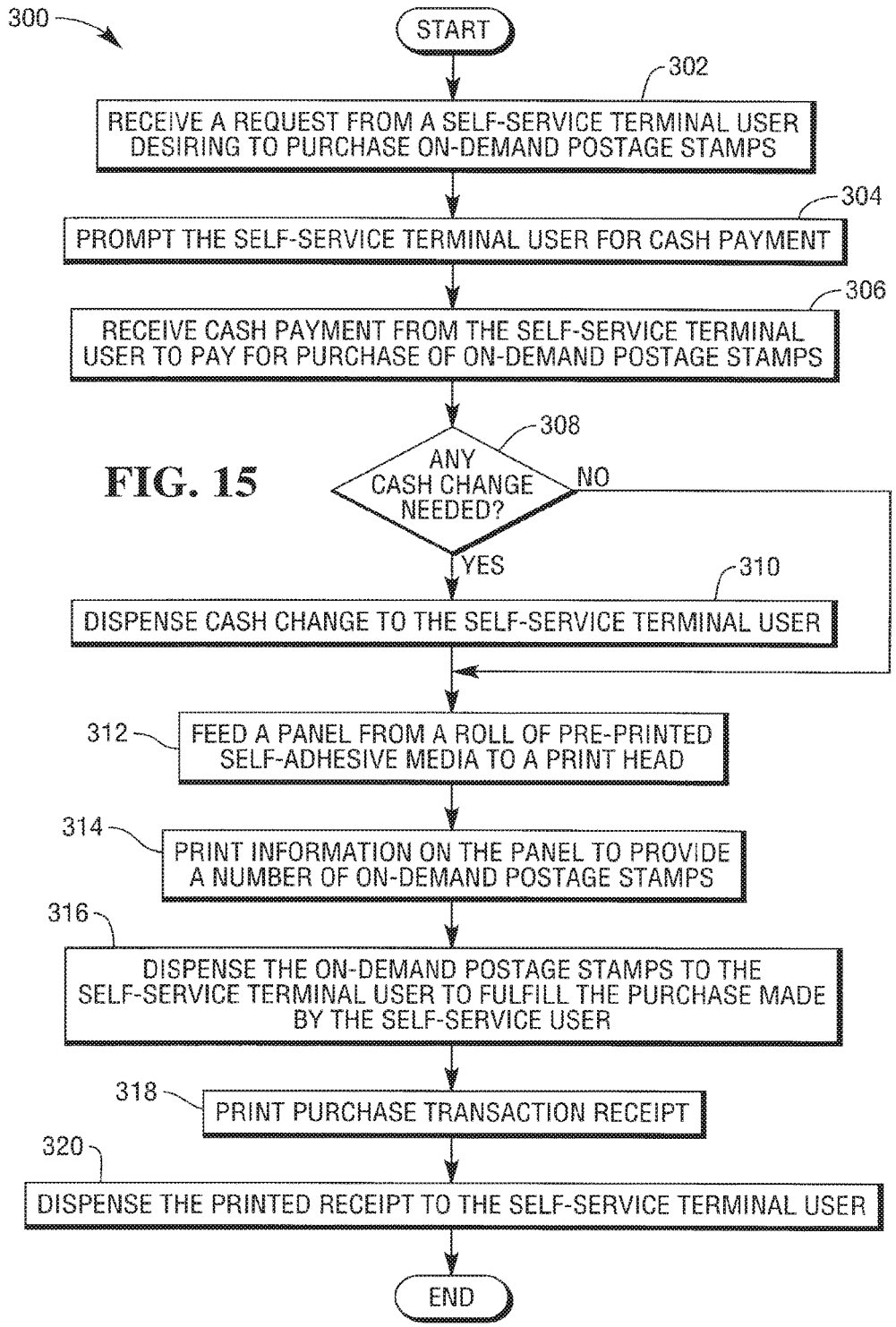

METHOD OF OPERATING A SELF-SERVICE TERMINAL TO PROVIDE ON-DEMAND POSTAGE STAMP LABELS TO A POSTAGE STAMP BUYER AND A SELF-SERVICE TERMINAL THEREFOR

TECHNICAL FIELD

This present application relates to dispensing of postage stamp labels at a self-service terminal, such as an automated teller machine (ATM), and is particularly directed to a method of operating a self-service terminal to provide on-demand postage stamp labels to a postage stamp buyer (such as an ATM customer) and a self-service terminal therefor.

BACKGROUND

There are numerous types of ATMs. One type of ATM is a cash withdrawal only ATM. In a typical cash withdrawal only ATM, an ATM customer is allowed to withdraw cash in a publicly-accessible, unattended environment. The ATM customer initially inserts a user identification card through a user card slot at the ATM, enters a personal identification number (PIN), and then enters the amount of cash to be withdrawn. After cash is dispensed, an ATM transaction receipt is printed and dispensed to the ATM customer.

Another type of ATM is a check depositing ATM. In a typical check depositing ATM, an ATM customer is allowed to withdraw cash and is also allowed to deposit a check (without having to place the check in any deposit envelope) in a publicly-accessible, unattended environment. To deposit a check, the ATM customer inserts a user identification card through a user card slot at the ATM, enters the amount of the check being deposited, and inserts the check through a check slot of a check acceptor. If the check is accepted for deposit, the amount of the check is deposited into the ATM customer's account and the check is transported to a storage bin within the ATM. If the check is not accepted for deposit, the check transport mechanism transports the check in a reverse direction along the check transport path to return the check to the ATM customer. After the check is deposited, an ATM transaction receipt is printed and dispensed to the ATM customer.

Some known ATMs allow ATM customers to buy postage stamp labels. In these known ATMs, dollar-bill size sheets of pre-printed postage stamp labels similar to sheets of pre-printed postage stamp labels sold by the United States Postal Service are loaded and stored in a cash cassette of the ATM. These sheets of pre-printed postage stamp labels are sometimes known as advanced purchased postage stamp labels in that they are designed to be purchased at a point of sale and then taken away from the point of sale to another location for later use. A drawback in these known ATMs is that the sheets of pre-printed postage stamp labels reduce the cash storage capacity of an ATM since the sheets occupy the storage space of a cash cassette. Since the cash storage capacity of an ATM is reduced, both cash replenishment frequency and cost for armored car companies are increased. It would be desirable to provide an ATM with capability to dispense postage stamp labels to ATM customers without having to reduce cash storage capacity of the ATM.

SUMMARY

In accordance with one embodiment, a publicly-accessible self-service terminal is provided for enabling a self-service terminal user to purchase on-demand postage stamp labels in advance. The publicly-accessible self-service terminal comprises a user interface arranged to receive a request from a postage stamp buyer to purchase on-demand postage stamp labels in advance, and a payment acceptor arranged to receive payment from the postage stamp buyer for purchase of on-demand postage stamp labels in advance. The terminal also comprises a roll paper printer including (i) a print head, (ii) a roll of pre-printed self-adhesive media, (iii) a first transport mechanism arranged to feed a panel portion of the roll of pre-printed self-adhesive media from the roll to the print head, (iv) a second transport mechanism arranged to dispense a panel portion of the roll of pre-printed self-adhesive media from the print head to the postage stamp buyer. The terminal further comprises a controller arranged to (i) control the first transport mechanism to feed a panel portion of the roll of pre-printed self-adhesive media from the roll to the print head when a request is received from the postage stamp buyer to purchase on-demand postage stamp labels in advance and payment is received from the postage stamp buyer for the purchase of on-demand postage stamp labels in advance, (ii) control the print head to print information onto the panel portion so as to provide at least one on-demand postage stamp label in advance, and (iii) control the second transport mechanism to dispense the at least one on-demand postage stamp label from the print head to the postage stamp buyer.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

FIG. 15 depicts a flow diagram of one embodiment of a method which may be implemented by the self-service terminal of FIGS. 13 and 14.

DETAILED DESCRIPTION

Figure 1:
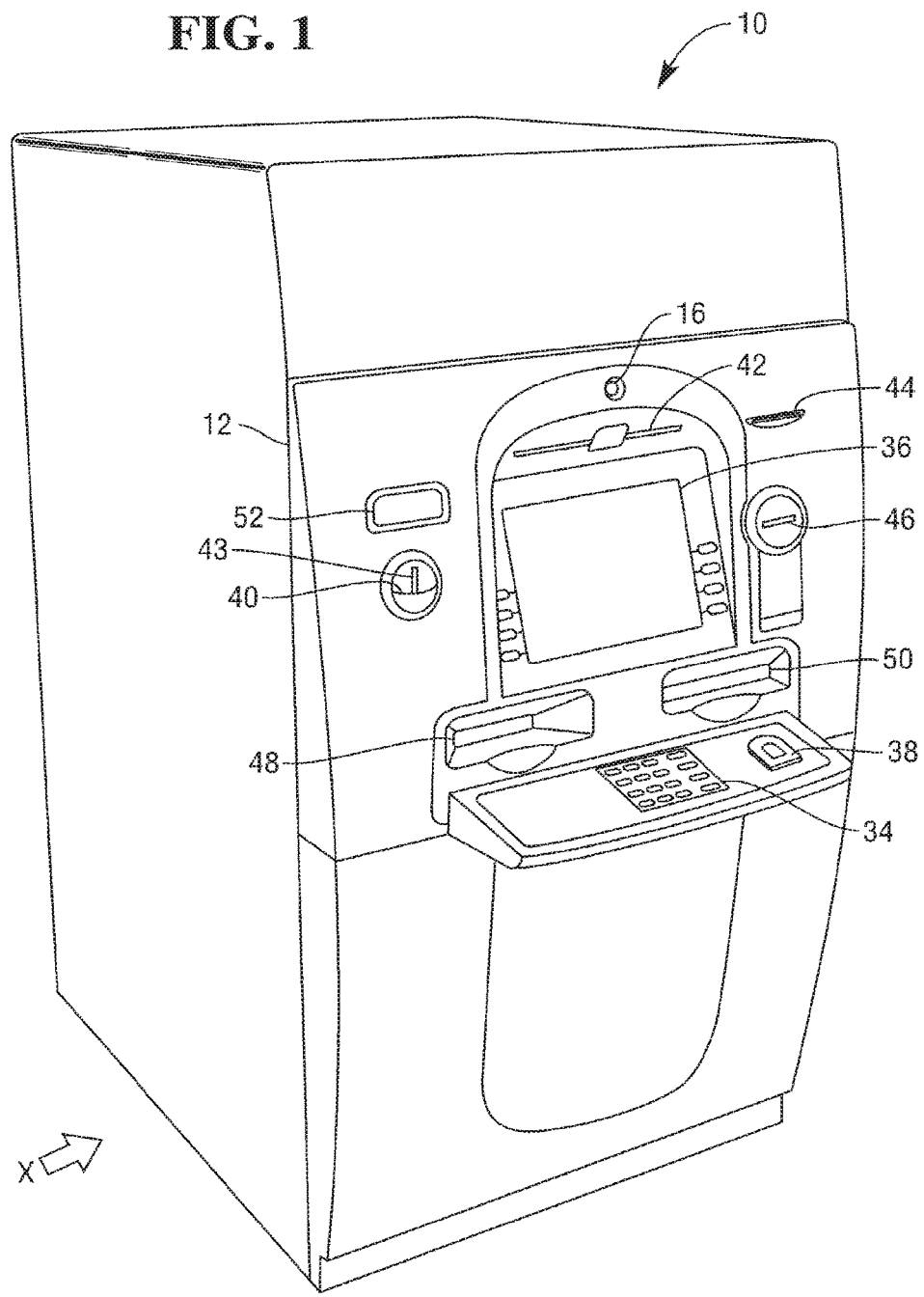
FIG. 1 is a left-front perspective view of an image-based check depositing automated teller machine (ATM) constructed in accordance with one embodiment.

Referring to FIG. 1, a self-service terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items and a tray 40 into which coins can be dispensed. The slots include a statement output slot 42, a coin slot 43, a receipt slot 44, a card reader slot 46, a first cash slot 48, a second cash slot 50, and a check input/output slot 52. The slots 42 to 52 and tray 40 are arranged such that the slots and tray align with corresponding ATM modules mounted within the ATM 10 as will be described later.

The fascia 12 provides a user interface for allowing an ATM customer to execute a transaction such as a conventional ATM transaction or a postage stamp label purchase transaction as will be described later. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
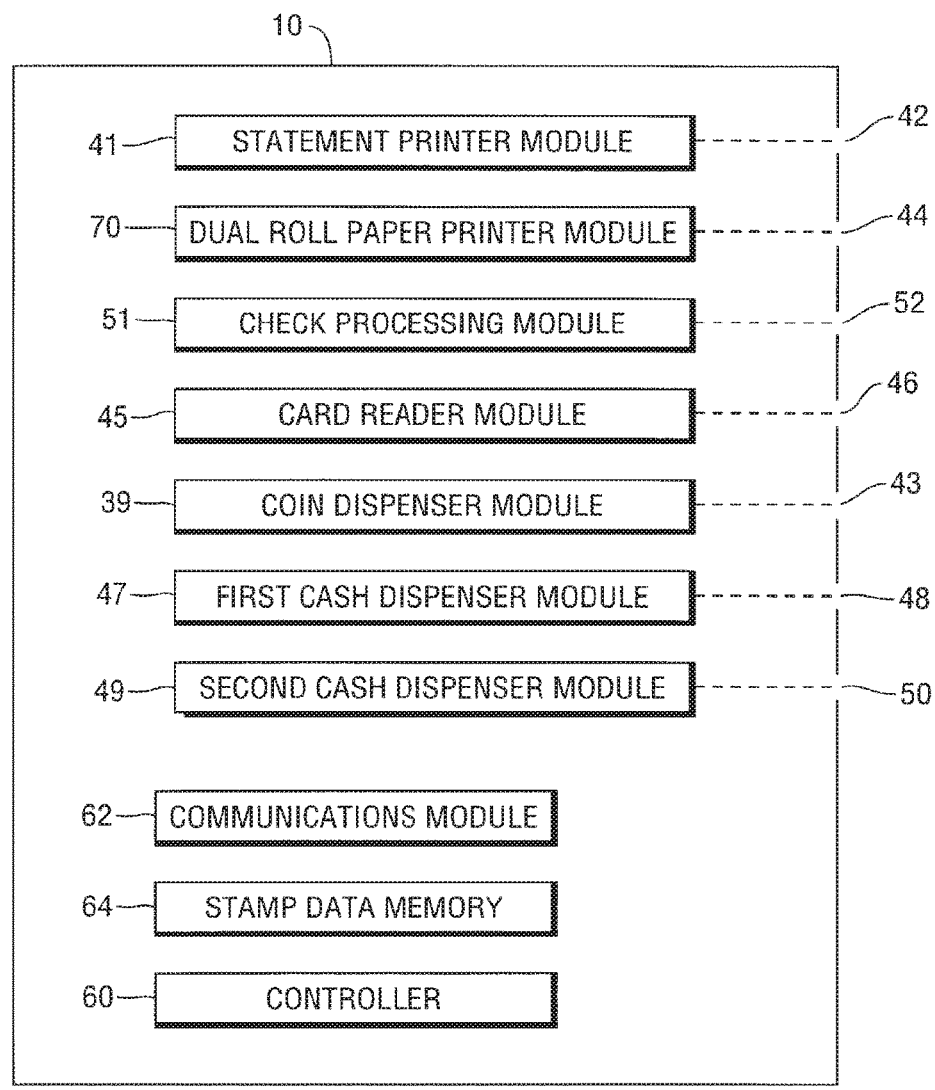
FIG. 2 is an elevational view of the ATM of FIG. 1, looking approximately in the direction of arrow X in FIG. 1, and showing some parts removed and some parts in block representation including a dual roll paper printer.

ATM modules mounted within the ATM 10 will now be described with reference to FIG. 2. FIG. 2 is an elevational view of the ATM 10 of FIG. 1, looking approximately in the direction of arrow X in FIG. 1, and showing some parts removed and some parts in block representation including a dual roll paper printer 70. A transport path (shown in broken line) is defined between the dual roll paper printer 70 and the receipt slot 44.

Other ATM modules include a statement printer module 41, a check processing module 51, and a card reader module 45. A transport path (shown in broken line) is defined between the statement printer module 41 and the statement output slot 42. A transport path (shown in broken line) is defined between the check processing module 51 and the check input/output slot 52. A transport path (shown in broken line) is defined between the card reader module 45 and the card reader slot 46.

Still other ATM modules include a coin dispenser module 39, a first cash dispenser module 47, and a second cash dispenser module 49. A transport path (shown in broken line) is defined between the coin dispenser module 39 and the coin slot 43. A transport path (shown in broken line) is defined between the first cash dispenser module 47 and the first cash slot 48. A transport path (shown in broken line) is defined between the second cash dispenser module 49 and the second cash slot 50.

A communications module 62 is connectable in secure electronic communications with the United States Postal Service (USPS) to request batches of unique serialized identification (ID) numbers for purpose of providing U.S. postage stamp labels, as will be described later. The batches of unique serialized ID numbers obtained from the USPS are stored in stamp data memory 64. An electronic controller 60 is provided for controlling operation of components including the ATM modules within the ATM 10.

Figure 3:
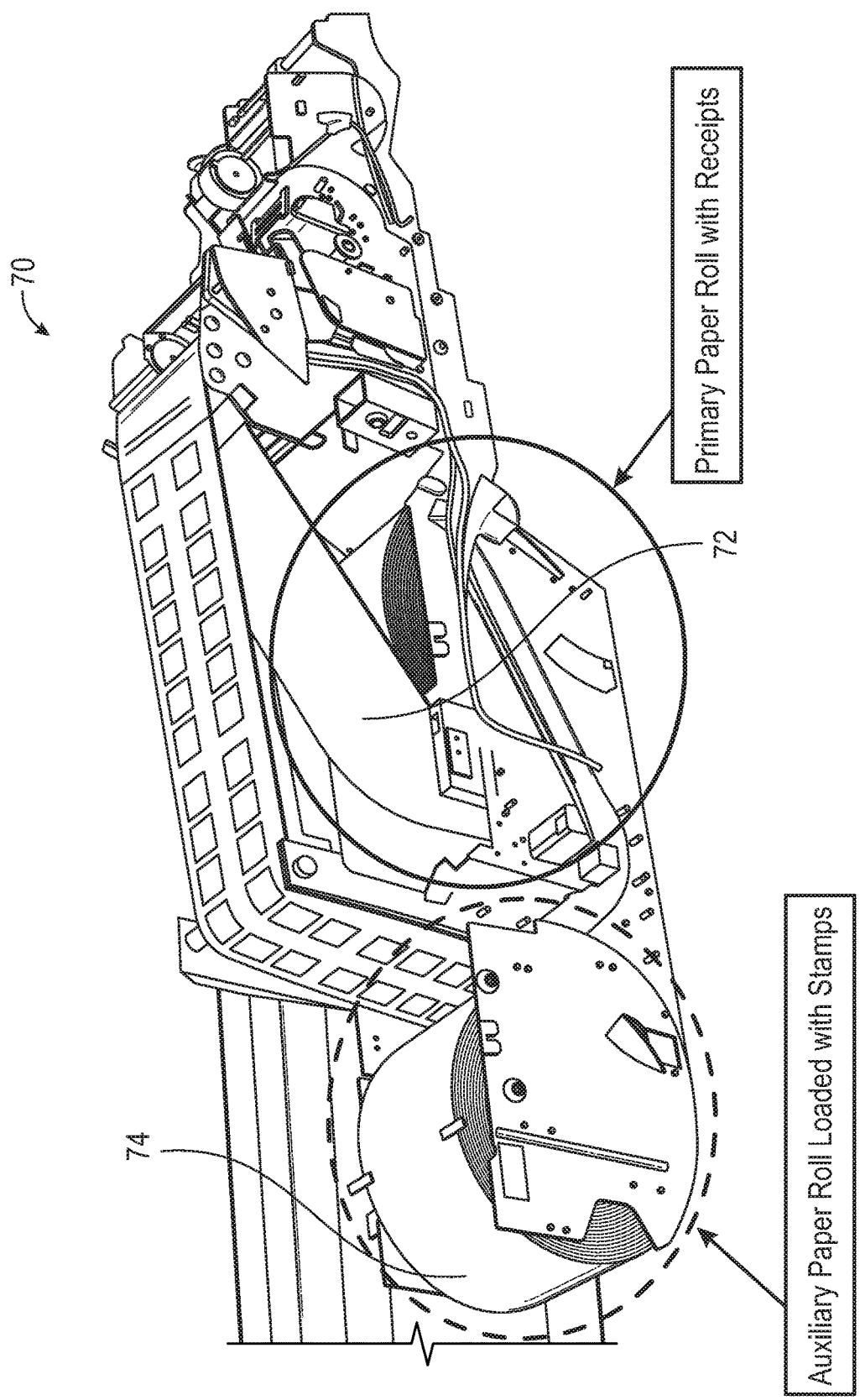
FIG. 3 is a perspective view of the dual roll paper printer shown in FIG. 2, and showing the printer as having a roll of pre-printed, self-adhesive media as one of the rolls.

Referring to FIG. 3, a perspective view of the dual roll paper printer 70 shown in FIG. 2 is illustrated. The dual roll paper printer 70 is a modification of a standard type of receipt printer used in conventional ATMs to print ATM transaction receipts. The modified printer 70 is capable of printing transaction receipts and postage stamp labels on-demand, as will be described later. Modifications to the printer 70 include removal of certain parts like front and rear guides, elimination of raised edges, and coating certain parts with a lacquer/plastic "anti-stick" coating so that postage stamp stock can be moved more smoothly and more quickly through the printer.

Figure 4:
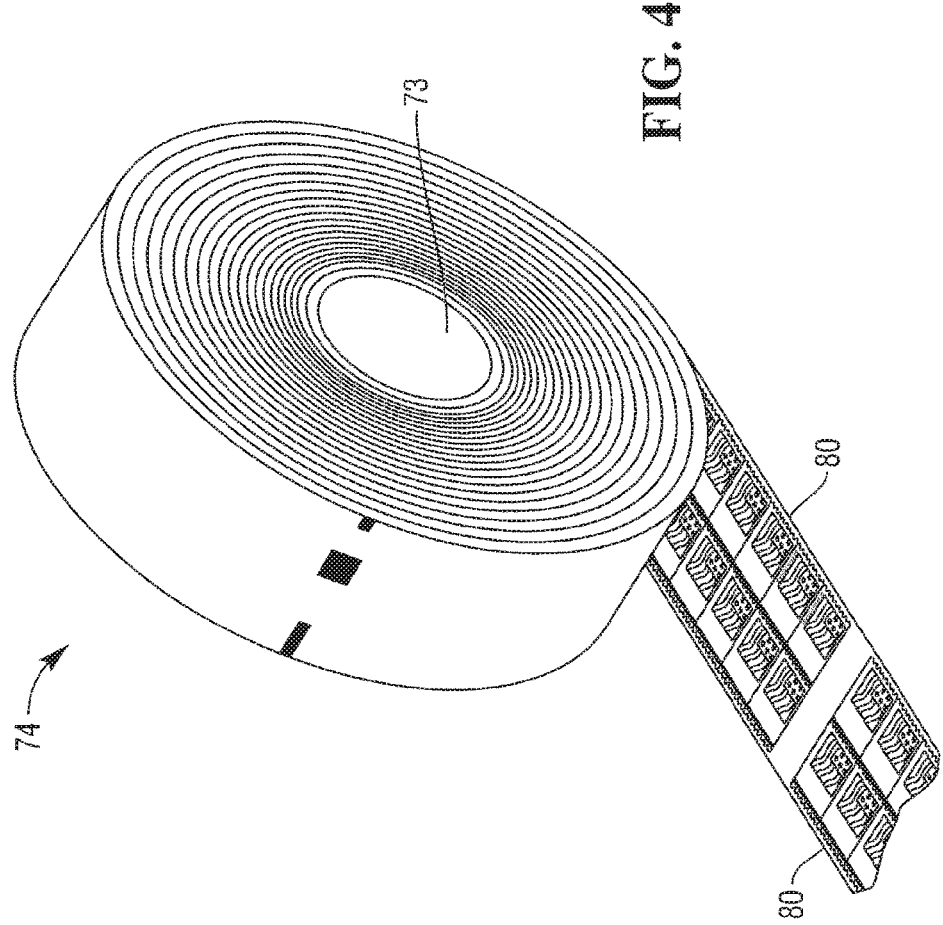
FIG. 4 is a perspective view of the roll of pre-printed, self-adhesive media shown in FIG. 3.

As shown in FIG. 3, the printer 70 includes a first roll 72 which comprises conventional thermal paper stock on which transaction data (such as ATM transaction data) can be printed to provide transaction receipts (such as ATM transaction receipts), and a second roll 74 which comprises stamp stock on which postage stamp data can be printed to provide on-demand postage stamp labels. More specifically, the second roll 74 comprises a roll of pre-printed, self-adhesive media such as shown in FIG. 4. The second roll 74 is about 79.5 mm+0.7 mm, −0.05 mm for ease of transport through the printer 70. The maximum roll width is 80 mm and the maximum roll diameter is 9". Each of the first and second rolls 72, 74 is wound and fed through conventional transport mechanisms which are controlled by the controller 60 (FIG. 2) so that either a transaction receipt or on-demand postage stamp labels are dispensed through the receipt slot 44 (FIGS. 1 and 2) to an ATM customer as will be described hereinbelow.

As shown in FIG. 4, a solid white plastic core 73 with a relatively large diameter may be used to minimize the wound in curl that would prevent stamp panels from laying flat. Wound in curl could also cause jamming at the exit of the printer 70. The solid white plastic core 73 may be 3.042"+/−0.01" ID, 3.392"+/−0.01" OD, and 3.15"+/−0.003" length. Core wall thickness may be from about ⅛" to about 3/16". Wind tension of the material on the cores keeps the rolls from telescoping and the material from moving side-to-side easily in the printer 70 causing jams. Increasing roll wind tension to produce a tighter roll eliminates telescoping and improves straightness of the feed path through the printer 70 reducing the potential of a media jam in the printer 70.

Figure 5:
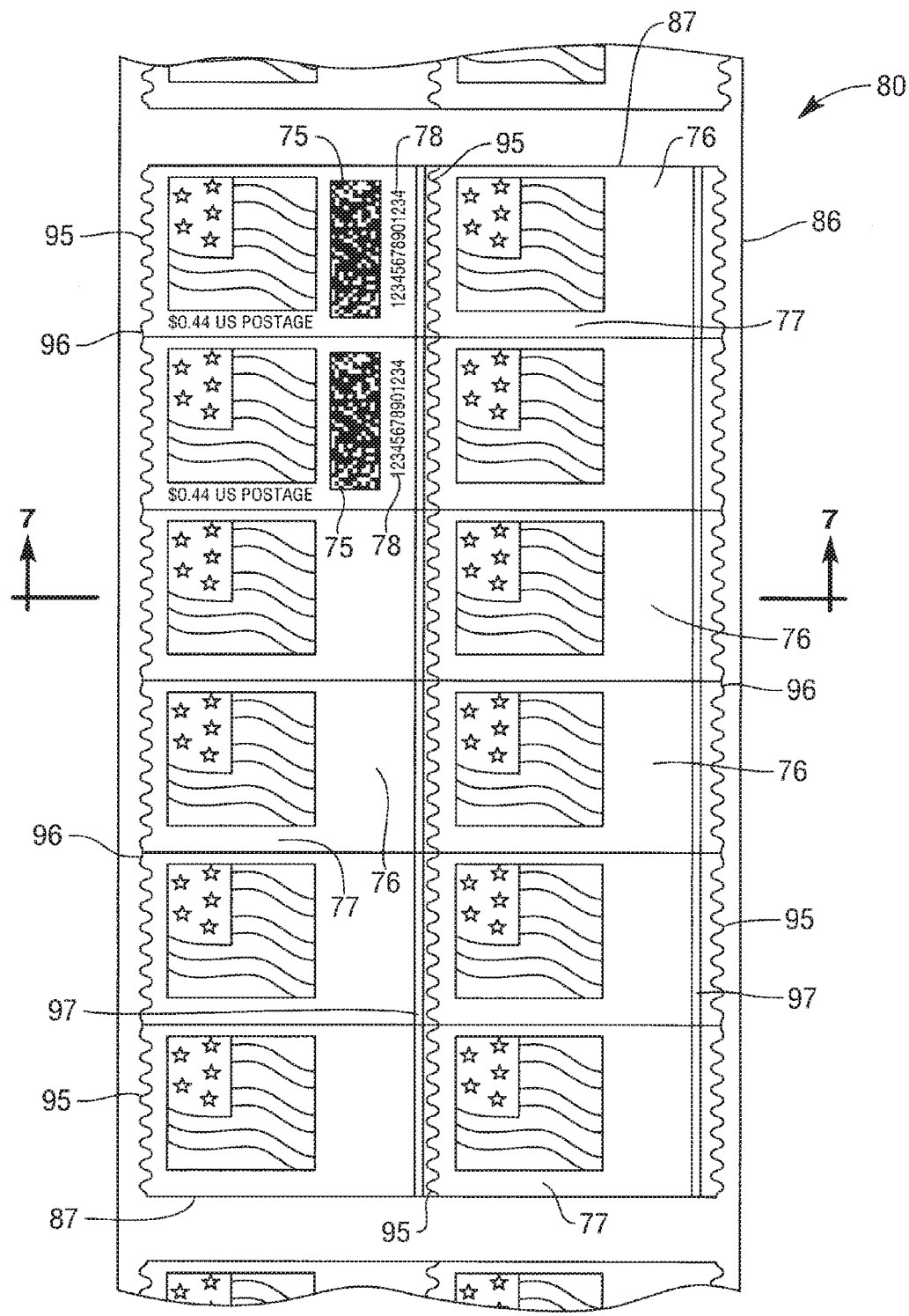
FIG. 5 is an enlarged front view of a stamp panel from the roll of pre-printed, self-adhesive media shown in FIGS. 3 and 4.
Figure 6:
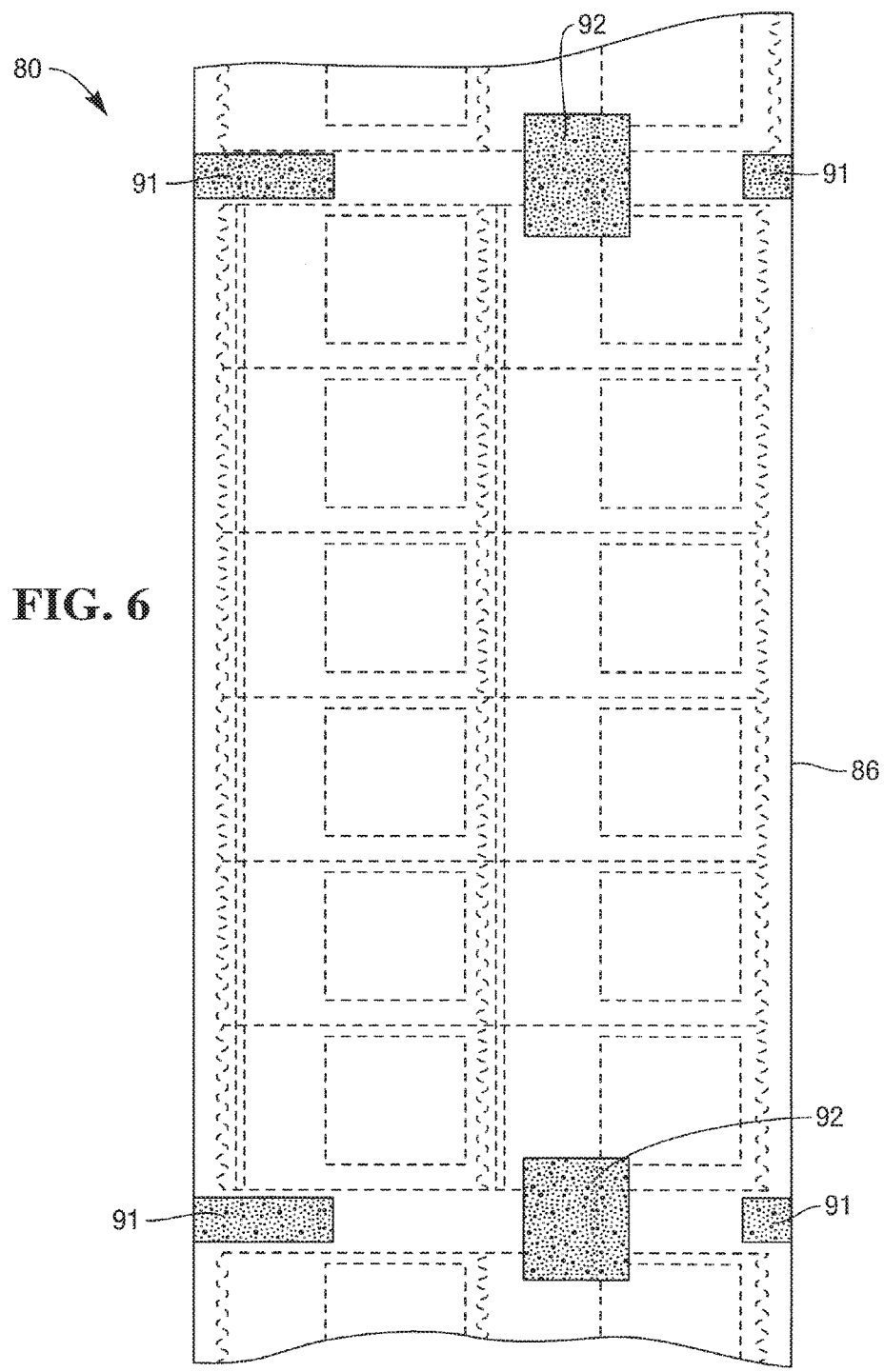
FIG. 6 is an enlarged back view of the stamp panel shown in FIG. 5.
Figure 7:
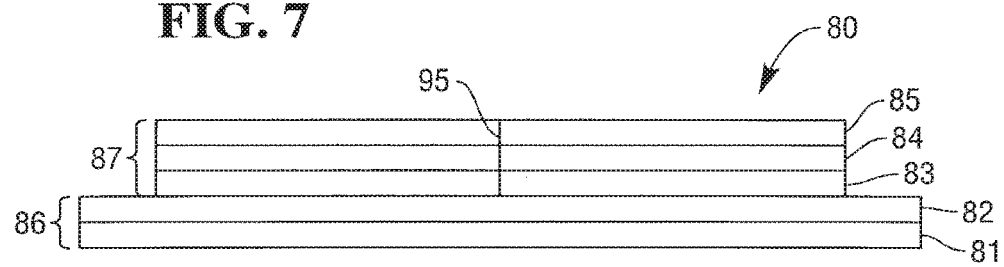
FIG. 7 is an enlarged cross-sectional view, taken approximately along line 7-7 in FIG. 5, and showing layers of the stamp panel.

FIG. 5 is an enlarged front view of a single panel portion 80 of the second roll 74. FIG. 6 is an enlarged back view of the panel 80, and FIG. 7 is an enlarged cross-sectional view, taken along line 7-7 in FIG. 5, and showing layers of the panel 80. As shown in FIG. 6, the panel 80 has a construction of five layers. The five layers include a liner substrate layer 81, a release coating layer 82 disposed on the liner substrate layer 81, an adhesive coating layer 83 disposed on the release coating layer 82, a label substrate layer 84 disposed on the adhesive coating layer 83, and a thermally-sensitive coating 85 disposed on the label substrate layer 84.

The liner substrate layer 81 and the release coating layer 82 together form a liner which is designated with reference numeral 86. The adhesive coating layer 83, the label substrate layer 84, and the thermally-sensitive coating 85 together form a label which is designated with reference numeral 87. The release coating layer 82 and the adhesive coating layer 83 are selected such that label 87 is releasably attached to the liner 86. Adhesion of the face stock to the liner 86 is sufficient for transport of the pressure sensitive label material through the printer 70 without individual die cut labels coming off in the inside of the printer. The label release force from the liner 86 may be about 100 g/2" at 90 degrees and 300 fpm.

Label material may be chosen with a standard 40 lb (lb/3000 ft) liner. As an example, standard supercalendered kraft liner has a release coating on the surface that allows a die-cut label with the adhesive to release from it easily when the ATM customer wishes to apply a postage stamp label to an object (e.g., letter, envelope, etc.) to be mailed. Inks used to prepare the pre-printed stamp labels may be water-based as they adhere to both the label face stock and the reverse side of the supercalendered kraft liner. An overprint varnish can be added to improve the adhesion of ultraviolet (UV) inks and increase the scuff and UV resistance of postage stamp labels.

Referring to FIG. 5, materials of the label 87 are selected to provide a white face stamp stock. The dynamic thermal sensitivity of the face stock may be specified either by a curve or such that the optical density at an applied energy of 0.5 mJ/dot should exceed 1.2, which would be typical for a high resolution direct thermal printing paper and given the resolution required for the readability of a two-dimensional barcode and other information to be printed thermally on the stamp label.

When the thermally-sensitive coating 85 of the label 87 is heated by a thermal print head, micro-encapsulated color developer and color former in the coating 85 melt, come in contact and react to form black dots of a thermal image. As shown in FIG. 5, one panel 80 of the white face stamp stock is pre-printed with twelve colored graphic images of an American flag. Each graphic image is pre-printed using a four color process which may be a flexographic four-color process or a lithographic four-color process, for examples. Each graphic image is pre-printed on an individual label of the panel 80. Accordingly, there are twelve individual labels shown in FIG. 5.

It is conceivable that graphic images other than an American flag may be used. As examples, the pre-printed graphic images may be selected to reflect the season, a holiday, or a promotional purpose. Accordingly, sales and marketing efforts are supported. Sufficient white space is left on each individual label for indicia and other information to be added so that a legal first class postage stamp label can be created as will be described hereinbelow. The size and orientation of the pre-printed graphics may be altered to make room for a unique media identification number which can be used as a security measure to keep track of the second roll 74 and ensure that no counterfeit media is generated and used to produce counterfeit stamp labels.

The size of white space 76 at the side of the four-color graphic image on each label is selected to accommodate the vertical thermal printing of a 12×36 pixel two-dimensional barcode 75 with a three pixel open area on all sides of the barcode. Each pixel is about 0.02" so that white space around the barcode 75 on all four sides is about 0.06". White space 76 is also provided for the printing of a postage meter ID 78 in a 4-point Helvetica bold font vertically along the right side of the barcode 75 just outside the barcode quiet zone. White space 77 below the image is sized to accommodate the horizontal printing of "$0.44" in at least 6-point Helvetica bold font, and "US Postage" in at least 5-point Helvetica bold font. A tolerance of about 1/32" is provided at both the top and bottom of each label to account for inaccuracies in registration during the printing process and to make sure that subsequent thermal printing ends up inside the physical borders of the stamp label.

As shown in FIG. 5, the panel 80 has twelve individual labels arranged in two parallel rows of six each. Each individual label is die-cut and is about 24 mm high by 36 mm wide. The size of the panel 80 is about 6"×3.15" which fits easily in a wallet or purse. The 2×6 panel approximates the dollar-bill-like size of sheet of stamps provided by the USPS and dispensed at ATMs. Other panel sizes are possible.

Serrations 95 improve the aesthetics of the stamp labels to make them appear more like the actual printed U.S. postage stamp labels purchased at a U.S. post office. Scalloped edges 96 are provided at sides of the individual labels to minimize peel off in the printer 70. The scalloped edges 96 facilitate removal of individual labels from the liner 86 when the ATM customer is ready to remove the stamp labels.

To produce legitimate stamps, the USPS requires a phosphorescent strip 97 to be printed on the stamp that they measure with a special meter in PMU units. The width of the security strip 97 may be about 1/16". The phosphorescent strip 97 may read between about 30 to about 70 PMU units. The size of the anilox may be selected to maximize the depth of color and fluorescence of the strip 97 while ensuring the drying of the ink so that it does not adhere to and pull off a black sense mark ink from the back of the liner 86 rolled against it in the roll 74. A 300 line anilox with a BCM of 7.5 may be selected. The vertical placement of the strip 97 is away from the four color image to increase its readability.

Referring to FIG. 6, black sense marks 91, 92 are located in positions to enable panel portions shown in FIG. 5 to be cut. FIG. 6 is an enlarged back view of the stamp panel shown in FIG. 5. A top-of-form sense mark (the center black sense mark on the back of the liner 86) signals the printer 70 when to begin to print to accurately register the thermal printing in the white space on the individual die-cut stamp labels. With additional print stations, printing other than the black sense marks could also be done on the reverse side of the liner 86 for either customer information or promotional purposes. As an example, instructions to the customer as to storage and handling of the stamp labels to maximize their life could be printed there.

Figure 8:
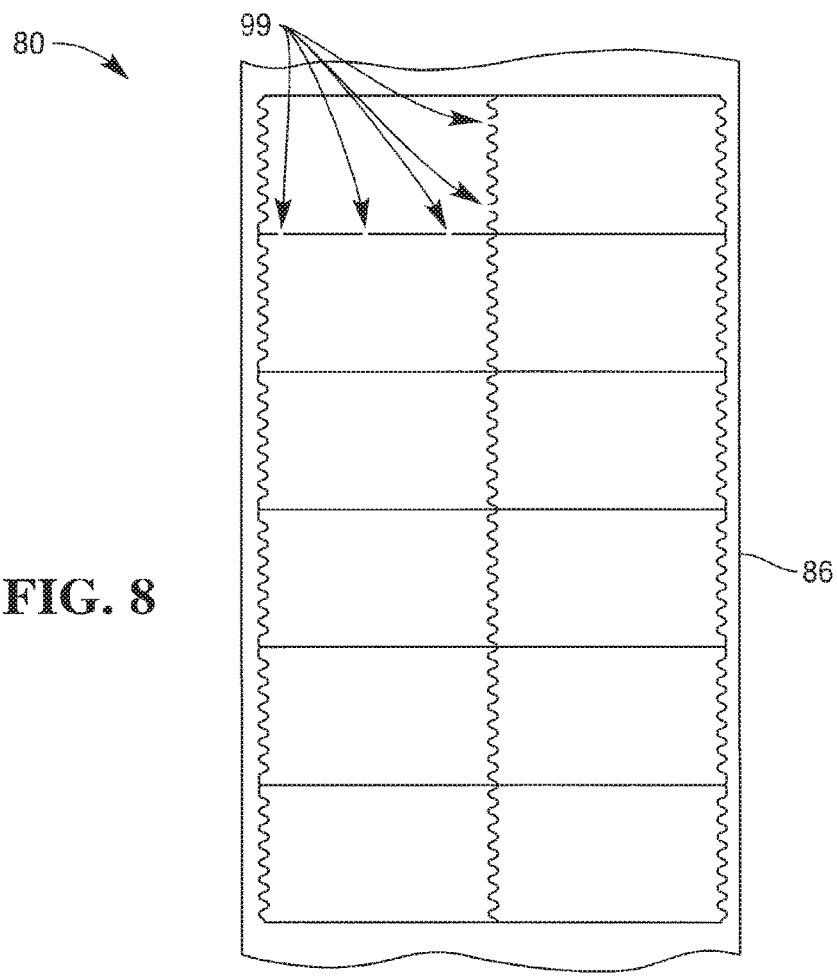
FIG. 8 is a view similar to FIG. 5, and showing die ties between individual stamp labels of the stamp panel.

FIG. 8 is a view similar to FIG. 5, and showing die ties between individual stamp labels of the stamp panel 80. For simplicity, die ties 99 associated with only one stamp label is shown in FIG. 8. To assist with the adherence of the die-cut labels to the face stock during transport through the printer 70, both horizontal and vertical tie lines 99 are provided.

A printing press for production of the pre-printed stamp labels may comprise a Webtron 1618, a narrow web pressure sensitive label press with six printing stations. The impression cylinder circumference is 12" making a 6" repeat of the stamp panels. The press used is 18" wide, so the stamp panels of twelve stamp labels are printed four across and the pre-printed web is slit to width and rolled onto a core such as the core 73 shown in FIG. 4.

Figure 9:
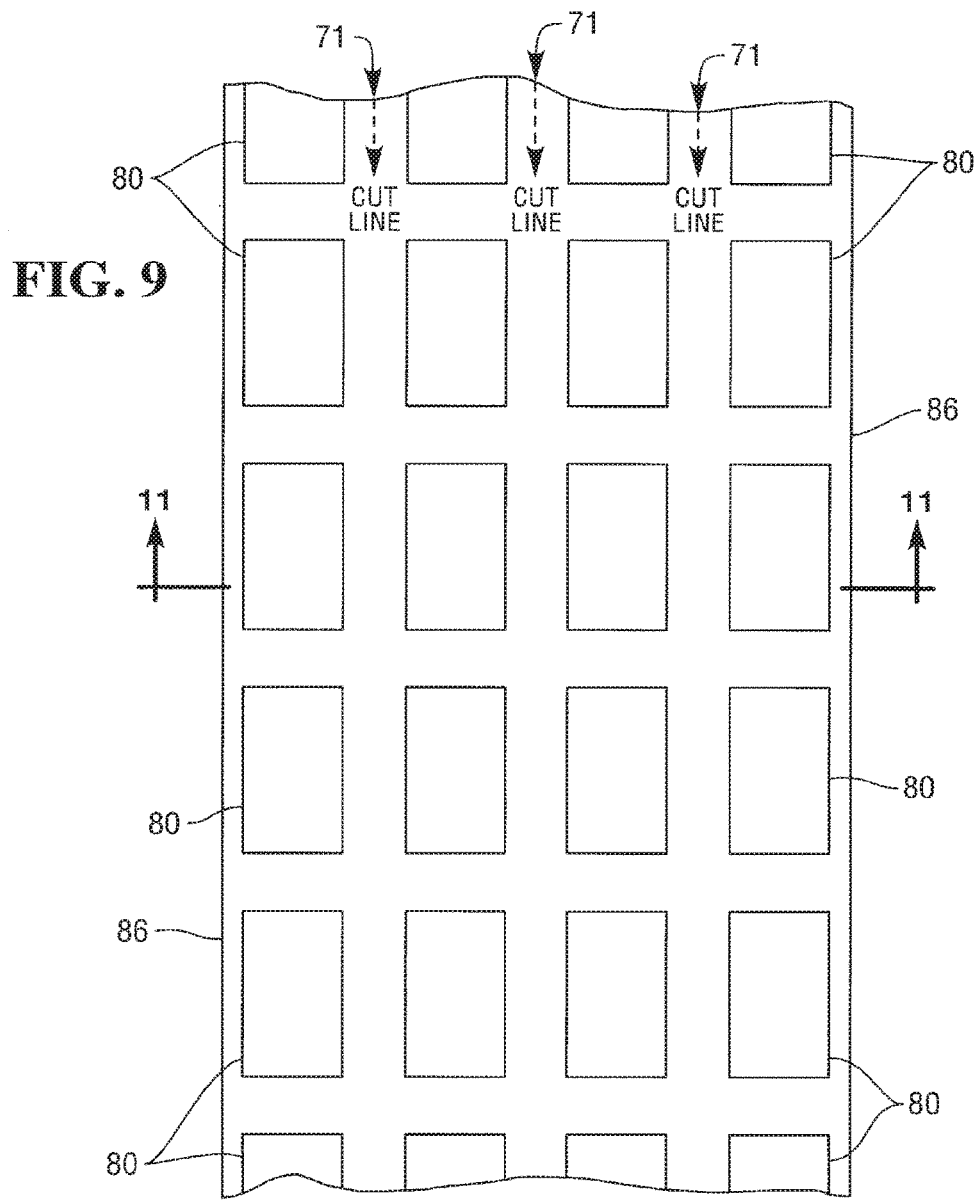
FIG. 9 is a front view showing sixteen stamp panels of FIG. 4 in relationship to each other during production of the roll of FIG. 4.

FIG. 9 is a front view showing sixteen stamp panels of FIG. 5 in relationship to each other during manufacture of the second roll 74 shown. FIG. 4. As shown in FIG. 9, four rolls in a side-by-side relationship are provided across a single liner substrate 76. The four rolls are separated by cutting the liner substrate 76 lengthwise between rolls at cut line locations designated with reference numeral 71. Individual rolls are then combined end to end to provide a final roll that goes into the printer 70. Roll length may be 675 feet for example. Other roll lengths are possible.

Figure 11:
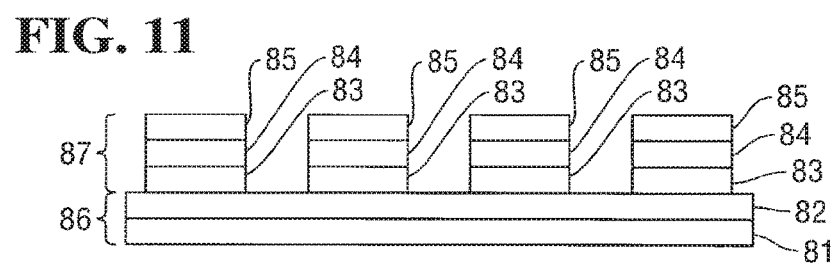
FIG. 11 is a cross-sectional view, taken approximately along line 11-11 in FIG. 9.
Figure 10:
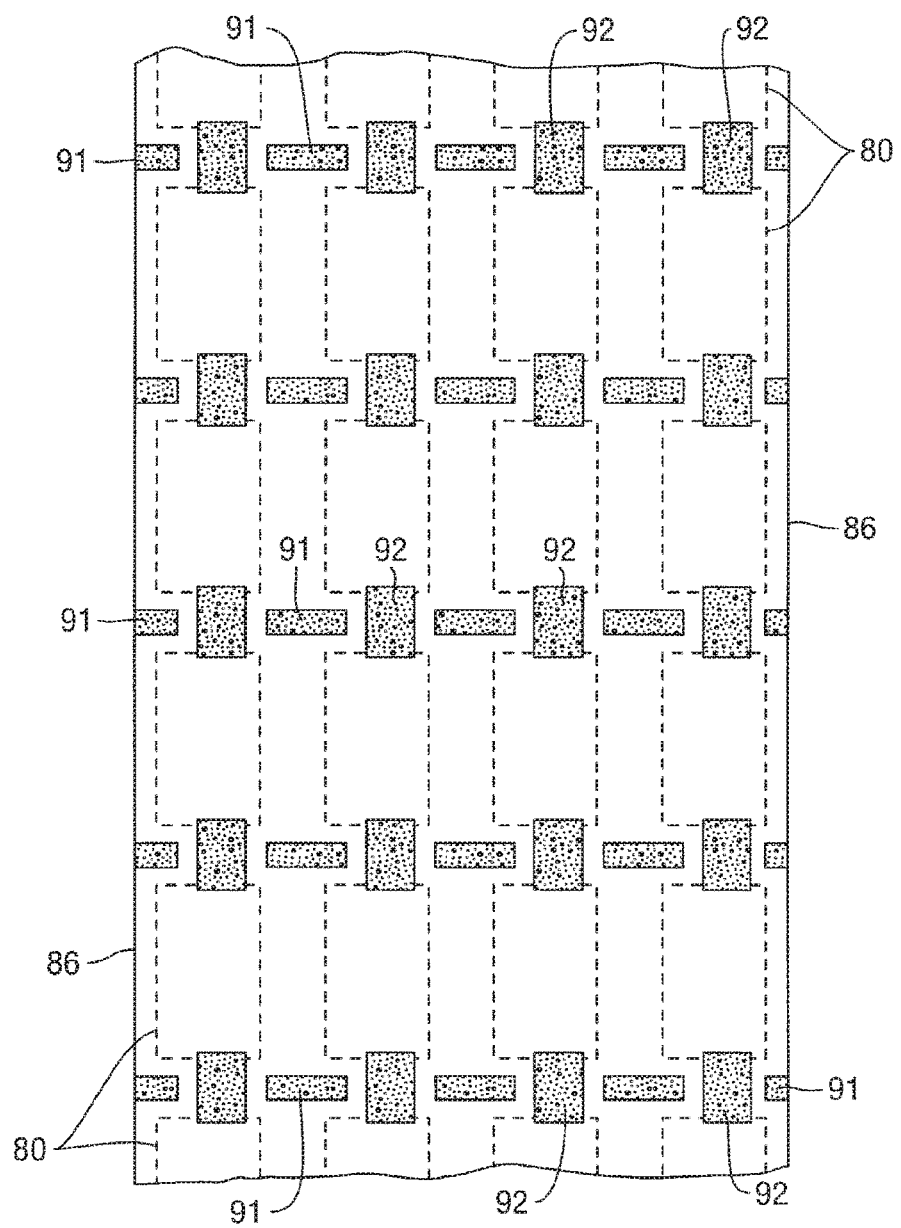
FIG. 10 is a back view of the sixteen panels shown in FIG. 9, and showing sense marks.

FIG. 10 is a back view of the sixteen panels shown in FIG. 9, and showing black sense marks 91, 92. FIG. 11 is a cross-sectional view, taken approximately along line 11-11 in FIG. 9. To make the black sense marks 91, 92 more visible to sensors in the ATM 10, the black sense mark density may be raised by using a specially-formulated dense black water-based flexo ink designed by Sun Chemical to which 5-15% rubine toner on weight of the black ink is added. Average print density may be raised to 1.5 by using the dense black sense mark ink toned with the rubine toner and using a 400 line anilox on the press with a 5.88 BCM (billionth cubic meter) to increase the volume of black ink printed.

Black sense marks repeat every 6" on the reverse of the liner 86 to indicate the point at which the panels 80 should be cut away from the roll when purchased from the ATM 10. The label matrix between the panels 80 of stamp labels containing the face stock and adhesive is stripped away such that the knife on the printer 70 does not cut through adhesive 83. This keeps adhesive from building up on the cutter in the printer 70. The matrix is also stripped from the sides of the stamp panels 80 to prevent peeling of the matrix in the printer 70 and to facilitate feeding of stamp panels through the printer. The addition of assist cuts in the die where the matrix is widest in the horizontal direction helps to increase the ease of matrix removal and allow the press to be run at higher speed.

Figure 12A:
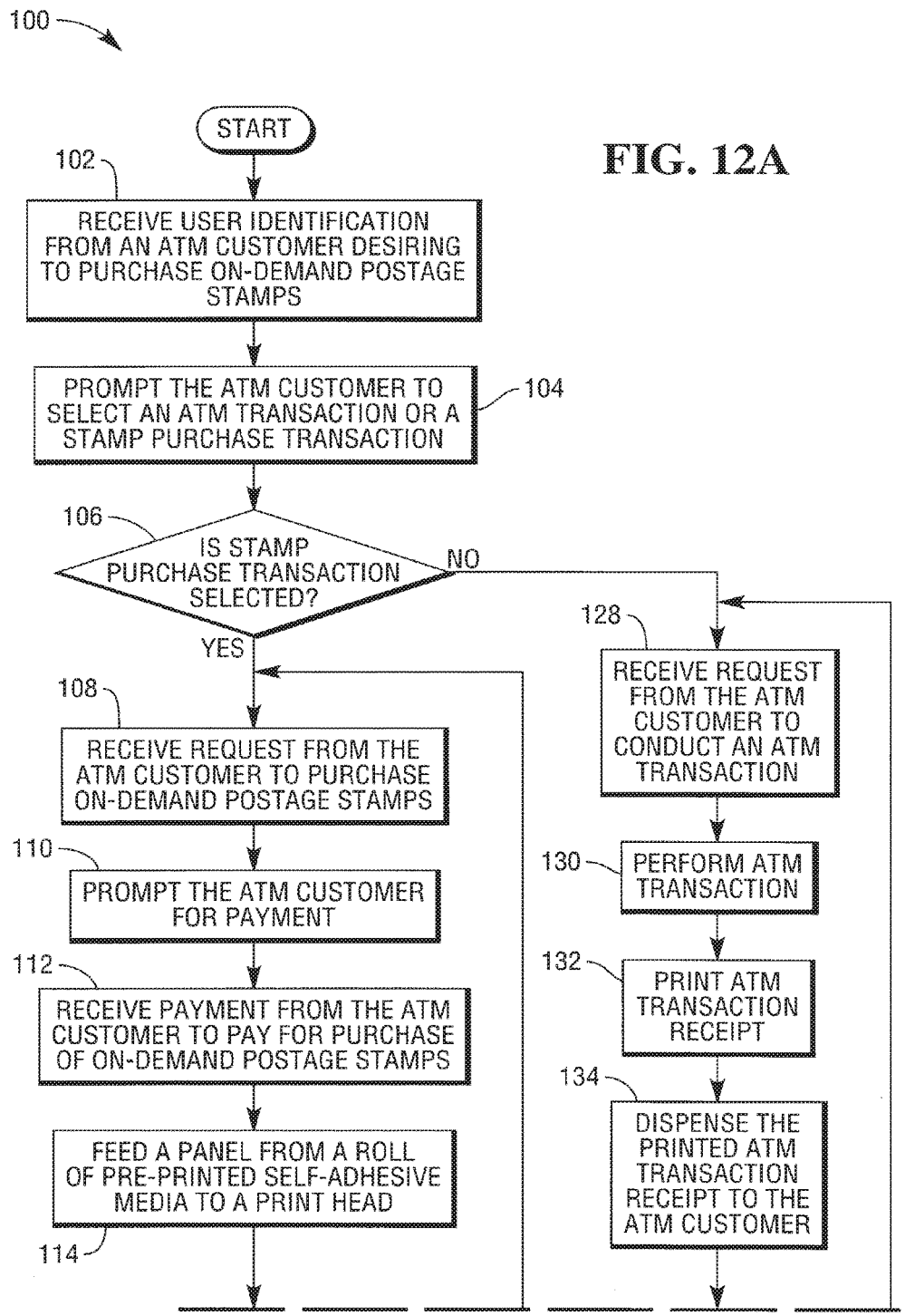
FIG. 12 depicts a flow diagram of one embodiment of a method which may be implemented by the ATM of FIGS. 1 and 2.
Figure 12B:
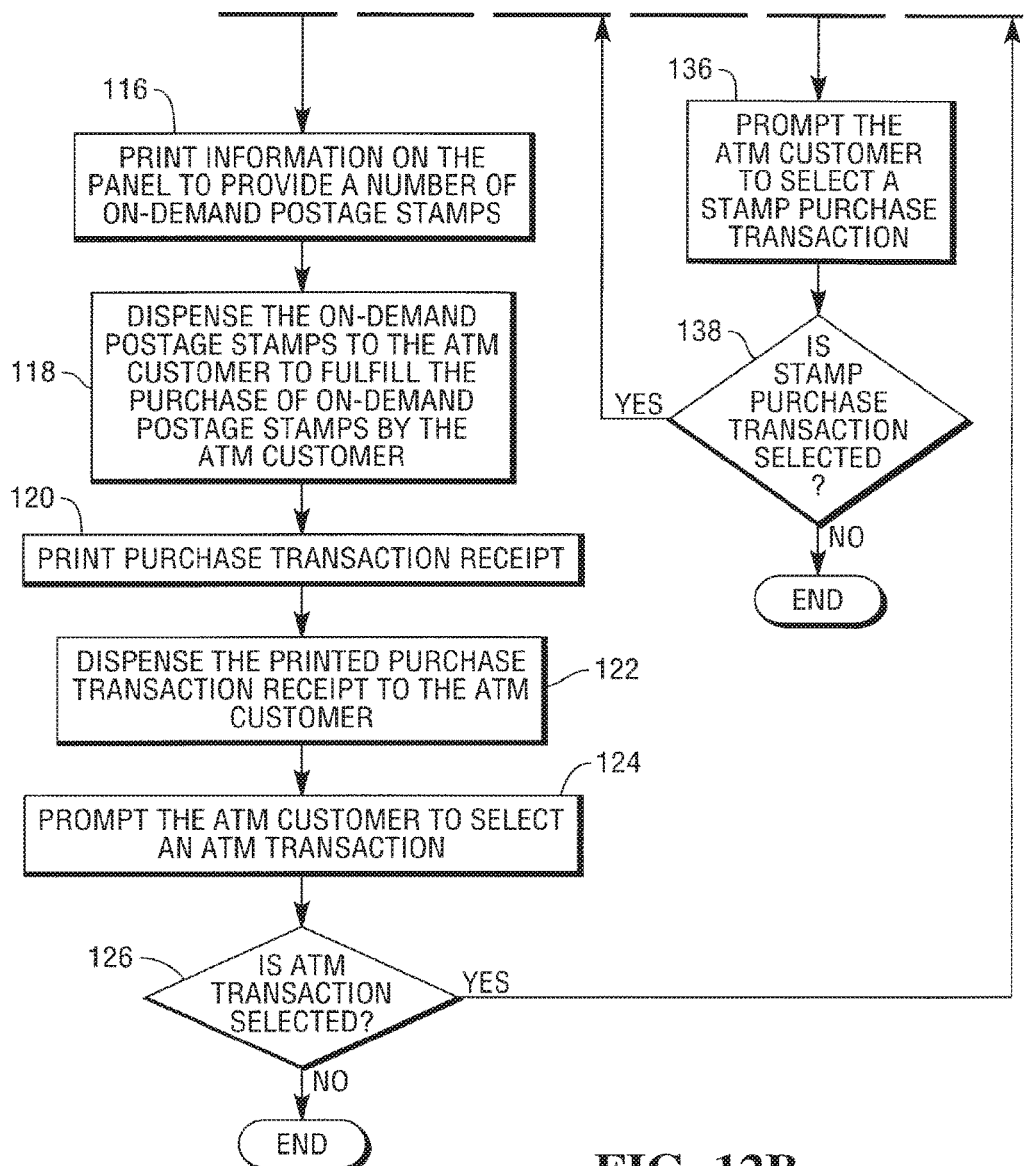

Referring to FIG. 12, a flow diagram 100 depicts one embodiment of a method which may be implemented by the ATM 10 of FIG. 1. In response to receiving user identification from an ATM customer (block 102), the ATM 10 prompts the ATM customer to select either an ATM transaction or a stamp purchase transaction to be conducted at the ATM 10 (block 114). A determination is made in block 106 as to whether stamp purchase selection has been made. If the determination in block 106 is affirmative (i.e., the ATM customer has selected a stamp purchase transaction), then the method proceeds to block 108 in which a request is received from the ATM customer to purchase on-demand postage stamp labels in advance at the ATM 10.

The ATM customer is then prompted to make payment for the purchase of on-demand postage stamps (block 110). After payment is received from the ATM customer to pay for the purchase of on-demand postage stamps (block 112), a panel 80 from the second roll 74 is fed to a thermal print head of the printer 70 for printing of indicia and other information thereon (block 114). The number of print heads may comprise one print head, two print heads, or more than two print heads. The printing on postage stamp labels requires only a single print head. The use of two or more print heads allows for printing on both sides of a receipt.

The indicia and other information include a two-dimensional barcode 75 (FIG. 5) in the white space 76 as shown in FIG. 5 (block 116). The unique serialized ID numbers stored in the stamp data memory 64 (FIG. 2) are used in the printing of the two-dimensional barcodes 75. Information to be thermally printed may be delivered as a digital map to the printer 70 and is printed on demand. Information may be delivered as a single bit map for a complete panel of twelve stamp labels at one time.

If not already pre-printed, the indicia and other information also include "$0.44" and "US Postage" in white space 77 as shown in FIG. 5. For simplicity, only two of the stamp labels are shown with the barcode 75 and other information. This printing of the indicia and other information produces legal first class U.S. postage stamp labels ready to be dispensed to the ATM customer to provide the ATM customer with a panel of postage stamp labels which have been produced on-demand in advance so that the ATM customer can carry the postage stamp labels away from the point of sale to another location and use them at a later time.

After a newly created panel of postage stamp labels is dispensed to the ATM customer (block 118), the ATM 10 prints a stamp purchase transaction receipt using thermal paper stock from the first roll 72 (block 120). The process of printing the stamp purchase transaction receipt is similar to the known process of printing an ATM transaction receipt and, therefore, will not be described. After the printed stamp purchase transaction receipt is dispensed to the ATM (block 122), the ATM 10 prompts the ATM customer as to whether the ATM customer now desires to perform an ATM transaction (block 124).

A determination is then made in block 126 as to whether the ATM customer has selected to conduct an ATM transaction. If the determination in block 126 is negative (i.e., the ATM customer has not selected to conduct an ATM transaction), then the method ends. However, if the determination in block 126 is affirmative (i.e., the ATM customer has selected to conduct an ATM transaction), the method proceeds to block 128. It should be noted that block 128 is the same block that the method proceeds to if the determination back in block 106 was negative (i.e., the ATM customer did not select to conduct a stamp purchase transaction).

After the ATM 10 performs a conventional ATM transaction with the ATM customer (block 130), the printer 70 prints an ATM transaction receipt (block 132) for the ATM transaction which has just been performed at the ATM 10. The printed ATM transaction receipt is dispensed to the ATM customer (block 134). The ATM customer is then prompted in block 136 as to whether the ATM customer desires to now conduct a stamp purchase transaction at the ATM 10. A determination is made in block 138 as to whether the ATM customer has selected to conduct a stamp purchase transaction. If the determination in block 138 is negative (i.e., the ATM customer has not selected to conduct a stamp purchase transaction, then the method ends. However, if the determination in block 138 is affirmative (i.e., the ATM customer has selected to conduct a stamp purchase transaction), then the method proceeds to block 108. The method from block 108 and on for an ATM transaction have already been described hereinabove.

Figure 13:
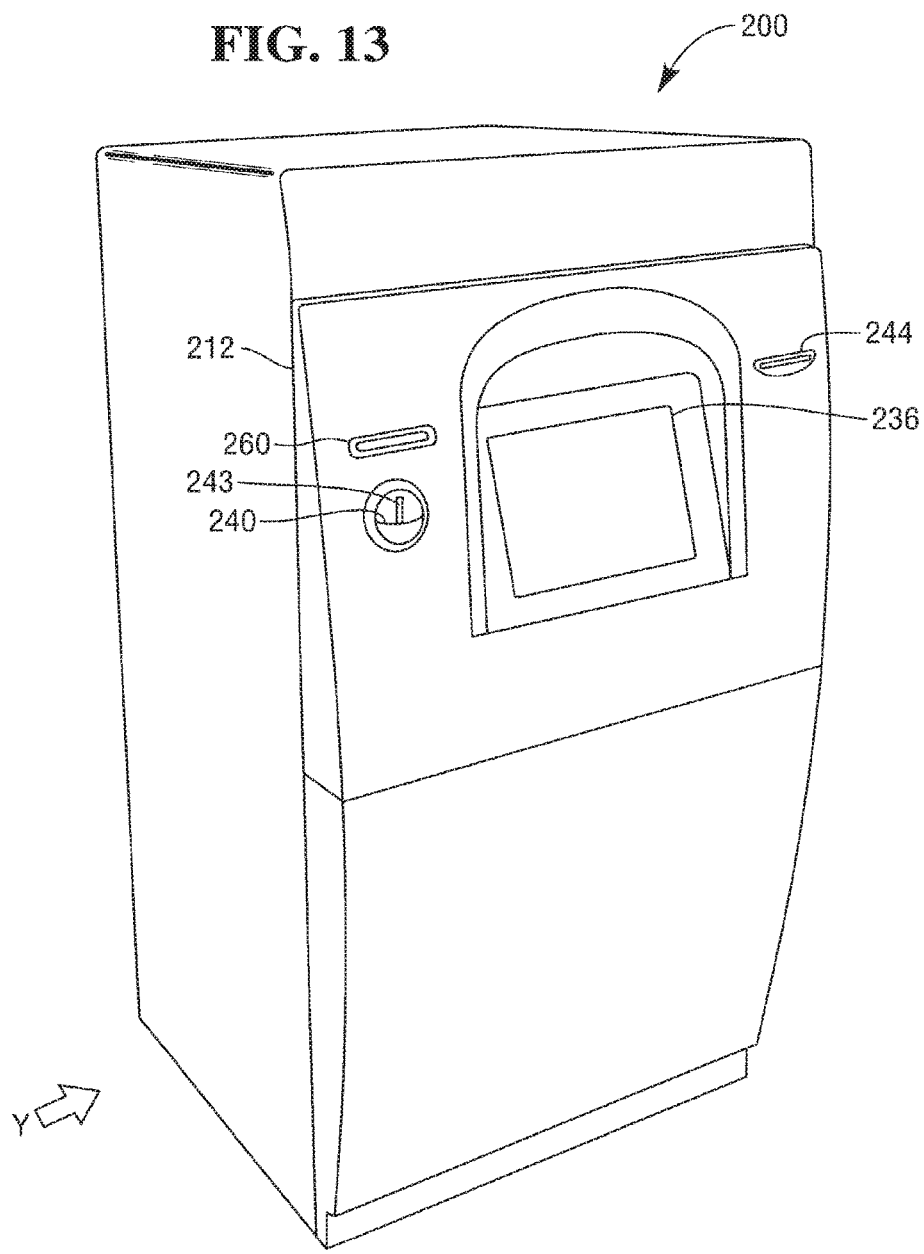
FIG. 13 is a left-front perspective view of a self-service terminal constructed in accordance with one embodiment.
Figure 14:
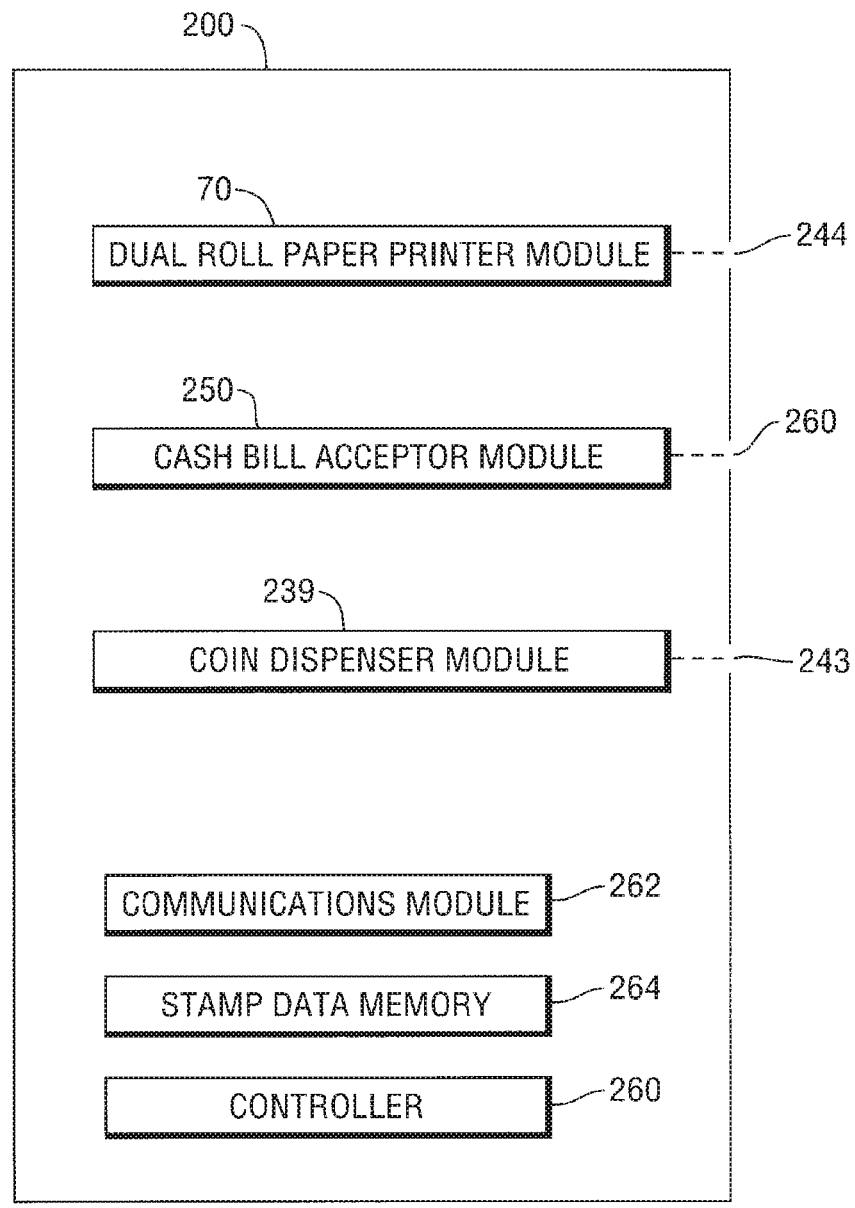
FIG. 14 is an elevational view of the self-service terminal of FIG. 13, looking approximately in the direction of arrow Y in FIG. 13, and showing some parts removed and some parts in block representation including the dual roll paper printer of FIGS. 2 and 3.

Referring to FIG. 13, a left-front perspective view of a self-service terminal 200 constructed in accordance with one embodiment is illustrated. FIG. 14 is an elevational view of the self-service terminal 200 of FIG. 13, looking approximately in the direction of arrow Y in FIG. 13, and showing some parts removed and some parts in block representation including a dual roll paper printer 270. The self-service terminal 200 is in the form of a standalone kiosk in which a person desiring to purchase on-demand postage stamp labels may do so. The self-service terminal 200 comprises a fascia 212 coupled to a chassis (not shown). The fascia 212 defines a number of slots for receiving and dispensing media items and a tray 240 into which coins can be dispensed. The slots include a coin slot 243, a receipt slot 244, and a bill acceptor slot 260. The slots 243, 244, 260, and tray 240 are arranged such that the slots and tray align with corresponding terminal modules mounted within the self-service terminal 200. A display 236 is provided for presenting screens to a self-service terminal user.

Terminal modules mounted within the self-service terminal 200 will now be described with reference to FIG. 14. FIG. 14 is an elevational view of the self-service terminal 200 of FIG. 13, looking approximately in the direction of arrow Y in FIG. 13, and showing some parts removed and some parts in block representation including a dual roll paper printer 70. A transport path (shown in broken line) is defined between the dual roll paper printer 70 and the receipt slot 244. Construction and operation of the dual roll paper printer 70 are the same as the dual roll paper printer 70 described hereinabove with reference to FIG. 3.

Other terminal modules include a coin dispenser module 239, and cash bill acceptor module 250. A transport path (shown in broken line) is defined between the coin dispenser module 239 and the coin slot 243. A transport path (shown in broken line) is defined between the cash bill acceptor module 250 and the bill acceptor slot 260.

A communications module 262 is connectable in secure electronic communications with the United States Postal Service (USPS) to request batches of unique serialized identification (ID) numbers for purpose of providing U.S. postage stamps, as will be described later. The batches of unique serialized ID numbers obtained from the USPS are stored in stamp data memory 264. An electronic controller 260 is provided for controlling operation of components including the terminal modules within the self-service terminal 200.

Referring to FIG. 15, a flow diagram 300 depicts one embodiment of a method which may be implemented by the self-service terminal 200 of FIG. 9. In response to receiving a request is received from the self-service terminal user to purchase on-demand postage stamps at the self-service terminal 200 (block 302), the self-service terminal user is prompted to make cash payment for the purchase of on-demand postage stamps (block 304). After payment is received from the self-service terminal user to pay for the purchase of on-demand postage stamps (block 306), a determination is then made in block 308 as to whether cash change needs to be provided to the self-service terminal user. If the determination in block 308 is affirmative (i.e., cash change is needed), then cash change in the form of coins are dispensed to the self-service terminal user. However, if the determination in block 308 is negative (i.e., cash change is not needed), then the method skips block 310 and proceeds directly to block 312.

In block 312, panel 80 from the second roll 74 is fed to a thermal print head of the printer 70 for printing of indicia and other information thereon. The indicia and other information include a two-dimensional barcode 75 in white space 76 as shown in FIG. 5 (block 314). The unique serialized ID numbers stored in the stamp data memory 264 (FIG. 14) are used in the printing of the two-dimensional barcodes 75. Information to be thermally printed may be delivered as a digital map to the printer 70 and is printed on demand. Information may be delivered as a single bit map for a complete panel of twelve stamp labels at one time.

If not already pre-printed, the indicia and other information also include "$0.44" and "US Postage" in white space 77 as shown in FIG. 5. For simplicity, only two of the stamp labels are shown with the barcode 75 and other information. This printing of the indicia and other information produces legal first class U.S. postage stamps ready to be dispensed to the ATM customer to provide the ATM customer with postage stamp labels which have been produced on-demand in advance so that the ATM customer can carry the postage stamps away from the point of sale to another location and use them at a later time.

After a newly created panel of postage stamp labels are dispensed to the self-service terminal user (block 316), the self-service terminal 200 prints a stamp purchase transaction receipt using thermal paper stock from the first roll 72 (block 318). The process of printing the stamp purchase transaction receipt is similar to the known process of printing an ATM transaction receipt and, therefore, will not be described. After the printed stamp purchase transaction receipt is dispensed to the self-service terminal user (block 320), the method ends.

It should be apparent that on-demand stamp labels described hereinabove are pre-printed in a continuous roll and not in sheets. Indicia and other information are thermally printed on media provided in roll form to the printer 70, and the individual stamp panels are then cut at predetermined positions signaled by black sense marks 91, 92 printed on the reverse side of the liner 86. Indicia and other information are thermally printed on media provided in roll form to the printer 70 and the individual stamp panels 80 are then cut at predetermined positions signaled by black sense marks 91, 92 printed on the reverse side of the liner 86.

It should also be apparent that the capability of an ATM to provide on-demand postage stamp labels in advance to postage stamp buyers, as described herein, allows the ATM to maintain a relatively large cash storage capacity since no cash cassette is taken up by sheets of stamp labels. Accordingly, cash replenishment frequency and use of armored car companies are reduced resulting in less operating costs.

It should be apparent that the electronics stamp data (i.e., the unique ID numbers) may be procured real-time on demand or in daily batches, etc., to match actual usage. Sheets of stamps (which may lie in an ATM for months before the revenue is realized) are not procured. Since sheets of stamps are not procured, capital outlay is reduced resulting in less cost.

It should be apparent that the roll 74 has no intrinsic value until a barcode and other information is printed and authenticates a postage stamp label. Accordingly, the impact of media waste or media damage is reduced.

It should also be apparent that if the roll length is 675 feet (for example), then there would be a total of 1350 stamp panels or 16,200 stamp labels. The length of the roll 74 may be shortened based on the expected sales volume of stamp labels such that stamp labels do not remain in a given self-service terminal beyond their recommended life which may be about six months.

Although the above-description describes providing a first class U.S. postage stamp label, it is conceivable that other classes and types of stamp labels may be provided. For example, it is conceivable that some stamp labels of a panel have one stamp value and that the remaining stamp labels have another stamp value. This may be convenient for some postage stamp buyers, especially when the USPS announces an increase in postal rates. As another example, it is conceivable that each stamp label has its own stamp value. As yet another example, it is conceivable that some stamp labels are U.S. postage stamp labels and some stamp labels are non-U.S. postage stamp labels. Accordingly, the self-service terminals provide owners or operators flexibility to introduce or offer varying stamp values. Moreover, postage stamp buyers may be able to purchase postage stamp labels having customized values based upon individual usage.

Also, although the above-description describes providing panels of on-demand postage stamp labels, it is conceivable that other types of labels may also be provided. As an example, return address labels taking the address of the customer from their bank records and printing it on predesigned panel of die-cut labels that would be dispensed with the stamp panel. This may require alternating the pre-printed stamps and blank address labels that would be blank for non-bank customers.

Although the above-description describes the PERSONAS (trademark) 6676 NCR ATM used in an embodiment, it is conceivable that other models of ATMs, other types of ATMs, or other types of self-service check depositing terminals may be used in other embodiments. As an example, the ATM may be a cash withdrawal only ATM in which an ATM can perform only one type of ATM transaction (i.e., withdraw cash). Self-service terminals are generally public-access devices that are designed to allow a user to conduct a self-service transaction in an unassisted manner and/or in an unattended environment. Self-service terminals typically include some form of tamper resistance so that they are inherently resilient.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A publicly-accessible self-service terminal for enabling a self-service terminal user to purchase on-demand postage stamp labels in advance, the publicly-accessible self-service terminal comprising:
    a user interface arranged to receive a request from a postage stamp buyer to purchase on-demand postage stamp labels in advance;
    a payment acceptor arranged to receive payment from the postage stamp buyer for purchase of on-demand postage stamp labels in advance;
    a roll paper printer including (i) a print head, (ii) a first roll of media, a second loll of pre-printed self-adhesive media, the second roll including a liner substrate layer, a release coating layer disposed on the liner substrate layer, and adhesive coating layer disposed on the release coating layer, and a label substrate layer disposed on the adhesive coating layer, (iv) a first transport mechanism arranged to feed a panel portion of the first roll of media from the first roll to the print head, a second transport mechanism arranged to feed a panel portion of the second roll of pre-printed self-adhesive media from the second roll to the print head, a third transport mechanism arranged to dispense a printed panel portion from the print head to the postage stamp buyer, and each postage stamp label having a release force from the liner substrate layer of approximately 100 g/2" at 90 degrees and 300 fpm;
    a controller arranged to (i) control the first transport mechanism to feed a panel portion of the first roll of media from the first roll to the print head when a request is received from the postage stamp buyer to purchase on-demand postage stamp labels in advance and payment is received from the postage stamp buyer for the purchase of on-demand postage stamp labels in advance, (ii) control the print head to print transaction information on the panel portion of the first roll to provide a transaction receipt, control the second transport, mechanism to feed a panel portion of the second roll of pre-printed self-adhesive media from the second roll to the print head when a request is received from the postage stamp buyer to purchase on-demand postage stamp labels in advance and payment is received from the postage stamp buyer for the purchase of on-demand postage stamp labels in advance, control the print head to print information onto the panel portion of the second roll of pre-printed self adhesive media so as to provide at least one on-demand postage stamp label in advance, and control the third transport mechanism to dispense the receipt and the at least one on-demand postage stamp label from the print head to the postage stamp buyer, and a receipt slot adapted to dispense both the on-demand postage stamp labels and the receipt; and
    wherein the first roll media is wound about a first core and the second roll of pre-printed self-adhesive media is wound about a second core having a larger diameter than a the first core to minimize curling of the second roll of pre-printed self-adhesive media within the publicly-accessible self-service terminal when exiting the roll paper printer to reduce jamming incidents and when dispensed from the publicly-accessible self-service terminal.

2. A publicly-accessible self-service terminal according to claim 1, wherein the controller is arranged to print a two-dimensional barcode onto the panel portion of the second roll of pre-printed self-adhesive media to authenticate the at least one on-demand postage stamp label in advance.

3. A publicly-accessible self-service terminal according to claim 2, wherein the controller is arranged to (i) print indicia which is indicative of the stamp value of each postage stamp label of the panel portion of the second roll of pre-printed self-adhesive media, and (ii) print indicia which is indicative of each postage stamp label of the panel portion of the second roll of pre-printed self-adhesive media being a postage stamp of the United States.

4. A publicly-accessible self-service terminal according to claim 1, wherein the payment acceptor is arranged to receive bills from the postage stamp buyer.

5. A publicly-accessible self-service terminal according to claim 1, further comprising a coin dispenser arranged to dispense coins to the postage stamp buyer in response to receiving bills from the postage stamp buyer for purchase of the at least one on-demand postage stamp label.

6. A publicly-accessible self-service terminal according to claim 1, wherein the payment acceptor includes a credit card reader arranged to make a charge against the credit card received from the postage stamp buyer.

7. A method of operating a publicly-accessible self-service terminal having a roll paper printer for providing on-demand postage stamp labels in advance to a postage stamp buyer, the method comprising:
    receiving a request from the postage stamp buyer to purchase on-demand postage stamp labels in advance;
    receiving payment from the postage stamp buyer for the purchase of on-demand postage stamp labels in advance;
    feeding a panel portion of a first roll of pre-printed self-adhesive media from the first roll to a print head of the roll paper printer when a request is received from the postage stamp buyer to purchase on-demand postage stamp labels in advance and payment from the postage stamp buyer is received for purchase of on-demand postage stamp labels in advance;

printing information onto the panel portion of the first roll of pre-printed self-adhesive media so as to provide at least one on-demand postage stamp label in advance;

dispensing, from the roll paper printer through a receipt slot the at least one on-demand postage stamp label in advance to the postage stamp buyer;

feeding a panel portion of a second roll of print media from the second roll to the print head of the roll paper printer;

control the print head of the roll paper printer to print transaction information on the panel portion of the second roll of print media to provide a receipt;

dispensing the printed receipt through the receipt slot from the roll paper printer; and wherein the first roll of pre-printed self-adhesive media is wound about a first core and the second roll of media is wound about a second core, the first core having a larger diameter than the second core to minimize curling of the pre-printed media within the publicly-accessible self-service terminal when exiting the roll paper printer to reduce jamming incidents and when dispensed from the publicly-accessible self-service terminal, and wherein the first roll of pre-printed self-adhesive media includes a liner substrate layer, a release coating layer disposed on the liner substrate layer, and adhesive coating layer disposed on the release coating layer, and a label substrate layer disposed on the adhesive coating layer, and wherein and each self-adhesive media having a release force from the liner substrate layer of approximately 100 g/2" at 90 degrees and 300 fpm.

8. A method according to claim 7, wherein printing information includes printing a two-dimensional barcode onto the panel portion of the first roll of pre-printed self-adhesive media to authenticate the at least one on-demand postage stamp label in advance.

9. A method according to claim 8, wherein printing information includes (i) printing indicia which is indicative of value of the at least one on-demand postage stamp label in advance, and (ii) printing indicia which is indicative of the at least one on-demand postage stamp label being a postage stamp of the United States.

10. A method according to claim 9, wherein (i) the panel portion of the first roll of pre-printed self-adhesive media comprises a dozen postage stamp labels, (ii) each postage stamp label including its own unique two-dimensional barcode, (iii) each postage stamp label including its own indicia which is indicative of its stamp value, and (iv) each postage stamp label including its own indicia which is indicative of it being a postage stamp of the United States.

11. A method according to claim 7, wherein receiving payment includes receiving a credit card from the postage stamp buyer and making a charge against the credit card received from the postage stamp buyer.

12. A method according to claim 7, wherein receiving payment includes receiving cash from the postage stamp buyer.

13. A method according to claim 7, wherein the publicly-accessible self-service terminal comprises an automated teller machine (ATM).

14. An automated teller chine (ATM) for enabling an ATM customer to conduct an ATM transaction and to purchase on-demand postage stamp labels in advance, the ATM comprising:

a ATM customer interface arranged to (i) receive a request from an ATM customer to conduct an ATM transaction when the ATM customer desires to conduct an ATM transaction, and (ii) receive a request from the ATM customer to purchase on-demand postage stamp labels in advance when the ATM customer desires to purchase on-demand postage stamp labels in advance;

a payment acceptor arranged to receive payment from the ATM customer for purchase of on-demand postage stamp labels in advance;

a roll paper printer including (i) a print head, (ii) a first roll of media, (iii) a second roll of pre-printed self-adhesive media and the second roll including a liner substrate layer, a release coating layer disposed on the liner substrate layer, and adhesive coating layer disposed on the release coating layer, and a label substrate layer disposed on the adhesive coating layer, (iv) a first transport mechanism arranged to feed a panel portion of the first roll of media from the first roll to the print head, (v) a second transport mechanism to feed a panel portion of the second roll of pre-printed self-adhesive media from the second roll to the print head, (vi) a third transport mechanism arranged to dispense a printed panel portion from the print head to the ATM customer, and wherein and each postage stamp label having a release force from the liner substrate layer of approximately 100 g/2" at 90 degrees and 300 fpm;

a controller arranged to (i) control the first transport mechanism to feed a panel portion of the first roll of media from the first roll to the print head when a request is received from the ATM customer to conduct an ATM transaction, (ii) control the print head to print ATM transaction information on the panel portion of the first roll to provide an ATM transaction receipt, (iii) control the second transport mechanism to feed a panel portion of the second roll of pre-printed self-adhesive media from the roll to the print head when a request is received from the ATM customer to purchase on-demand postage stamp labels in advance and payment is received from the ATM customer for the purchase of on-demand postage stamp labels in advance, (iv) control the print head to print postage stamp information onto the panel portion of the second roll to provide at least one on-demand postage stamp label in advance, and (v) control the third transport mechanism to dispense either an ATM transaction receipt or at least one on-demand postage stamp label from the print head to the ATM customer and a receipt slot adapted to dispense both the on-demand postage stamp labels and the ATM transaction receipt; and wherein the first roll of media is wound about a first core and the second roll of pre-printed self-adhesive media is wound about a second core, the second core having a larger diameter than the first core to minimize curling of the pre-printed self-adhesive media within the ATM when exiting the roll paper printer to reduce jamming incidents and when dispensed from the ATM.

15. An ATM according to claim 14, wherein the controller is arranged to print a two-dimensional barcode onto a panel portion of the second roll of pre-printed selfadhesive media to authenticate at least one on-demand postage stamp label in advance when the ATM customer has made a request to purchase on-demand postage stamp labels in advance.

16. An ATM according to claim 15, wherein the controller is arranged to (i) print indicia which is indicative of value of the at least one on-demand postage stamp label in advance when the ATM customer has made a request to purchase on-demand postage stamp labels in advance, and (ii) print indicia which is indicative of the at least one on-demand postage stamp label being a postage stamp of the United States when the ATM customer has made a request to purchase on-demand postage stamp labels in advance.

\* \* \* \* \*

UNITED STATES PATENT AND TRADEMARK OFFICE
CERTIFICATE OF CORRECTION

PATENT NO. : 9,524,517 B2
APPLICATION NO. : 13/102803
DATED : December 20, 2016
INVENTOR(S) : McGivney et al.

Page 1 of 1

It is certified that error appears in the above-identified patent and that said Letters Patent is hereby corrected as shown below:

In Column 11, Line 42, in Claim 1, delete "loll" and insert --roll--, therefor

In Column 11, Line 47, in Claim 1, delete "(iv)" and insert --(iii)--, therefor

In Column 11, Line 67-68, in Claim 1, delete "transport," and insert --transport--, therefor In Column 12, Line 21, in Claim 1, after "than", delete "a", therefor In Column 13, Line 61, in Claim 14, delete "chine" and insert --machine--, therefor In Column 14, Line 57, in Claim 15, delete "selfadhesive" and insert --self-adhesive--, therefor Signed and Sealed this
Twenty-fifth Day of September, 2018

Andrei Iancu
*Director of the United States Patent and Trademark Office*